Patented Aug. 13, 1935

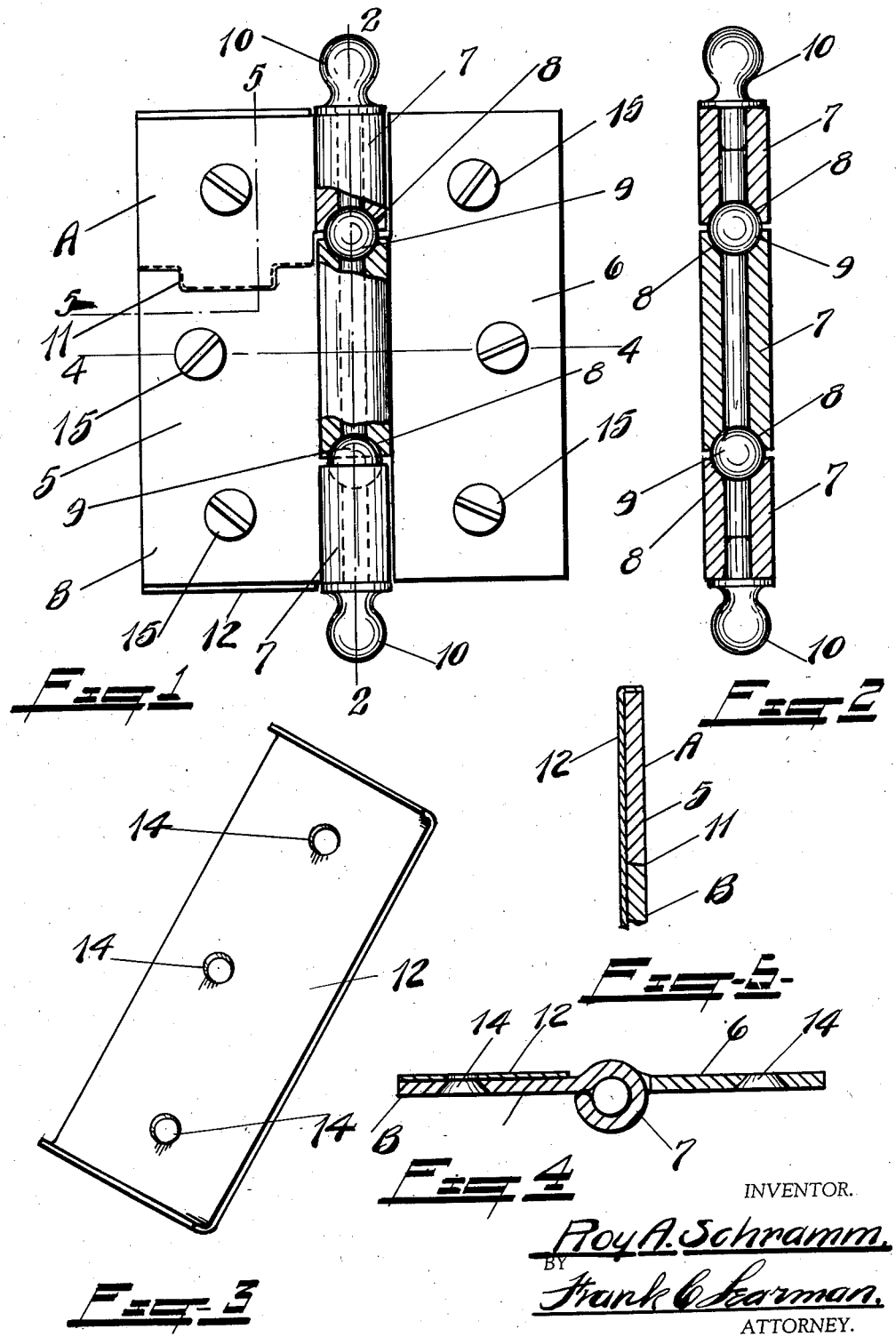

2,010,901

UNITED STATES PATENT OFFICE 2,010,901

BALL BEARING HINGE

Roy A. Schramm, Bay City, Mich.

Application May 18, 1934, Serial No. 726,334

1 Claim. (Cl. 16—171)

This invention relates to hinges such as used on doors, windows, and articles of a like nature which must be swung to open or closed positions.

One of the prime objects of the invention is to design a hinge provided with ball bearing pintle sections so that the swinging of the structure will be smooth and noiseless.

Another object is to provide a ball bearing hinge which can be readily and economically manufactured and applied, and which will wear for an indefinite period of time, which will not bind and squeak, which will swing true, and which is equally adaptable for use on large, heavy doors or small, hinged members.

With the above and other objects in view, the present invention consists in the combination and arrangement of parts, hereinafter more fully described, illustrated in the accompanying drawing, and particularly pointed out in the appended claim, it being understood that changes may be made in the form, size, proportion, and minor details of construction, without departing from the spirit, or sacrificing any of the advantages of the invention.

In the drawing—

Fig. 1 is a side elevation partly broken away and in section.

Fig. 2 is a vertical section on the line 2—2 of Fig. 1.

Fig. 3 is an isometric view of the backing plate.

Fig. 4 is a transverse sectional view taken on the line 4—4 of Fig. 1.

Fig. 5 is a fragmentary section taken on the line 5—5 of Fig. 1.

I am aware that hinges have heretofore been designed utilizing balls instead of the conventional pintles, but these require special machining to manufacture, cannot be disconnected after being assembled, and are entirely too expensive to manufacture, and I have, therefore, perfected a ball bearing hinge which utilizes a plurality of balls for bearings, and in which the leaves can be divided to permit the hinge to be readily connected or disconnected.

Referring now more particularly to the drawing, the numerals 5 and 6 indicate the leaves of the hinge, the inner edges of which are rolled into tubular knuckles 7 in the usual manner, the inner ends of said tubular knuckles being shaped to form ball seats 8 in which the balls 9 are mounted, and knobs 10 are provided on the outer end of the hinge knuckles; these, however, serve no useful purpose and are for ornamental effect only.

In order that the hinge may be assembled either at the factory or when installing, I split the leaf member 5 on the line 11 and provide a backing plate 12 in which the leaf sections "A" and "B" are accommodated therebetween, screw openings 14 being provided in said sections and plate to receive the screws 15 in the conventional manner, and I wish to direct particular attention to the fact that the abutting edges of the sections "A" and "B" are beveled as shown at 16 to facilitate the assembly, and form a tight rigid connection.

The opposite leaf 6 is formed in an identically similar manner, having a tubular knuckle section 7, the ends of which are suitably turned to accommodate and nest the balls 9, and when assembling in the factory, the section "B", together with the backing plate 12, and the leaf 6 are first placed in assembled relation, with the lower ball in proper position. I then add the upper ball and section "A" of the plate 5, insert the screws, and the assembly is complete.

In small hinges it may be found desirable to weld the sections "A" and "B" together on the line 11 after assembly; this would eliminate the backing plate and make for economical construction, but for medium size and large doors and swinging structures the backing plate is necessary.

The hinge construction is practical and economical, it eliminates squeaks, is easy and smooth in operation, will not become sloppy with long wear, as these ball seats can be readily coined and hardened.

From the foregoing description it will be obvious that I have perfected a simple, smooth operating, ball bearing hinge for use on swinging doors and structures of like nature.

What I claim is:

A hinge of the class described and comprising a pair of leaves formed with tubular knuckles, the abutting ends of said knuckles being shaped to accommodate an annular ball, one of said plates being transversely divided, and a backing plate provided with upturned ends adapted to be secured to said divided plate for securing said plate in assembled relation.

ROY A. SCHRAMM.